Jan. 2, 1934.  E. O. HILLER  1,941,896
PHOTO-ELECTRIC CONTROL OF GLASS FEEDERS
Filed June 10, 1931  2 Sheets-Sheet 2
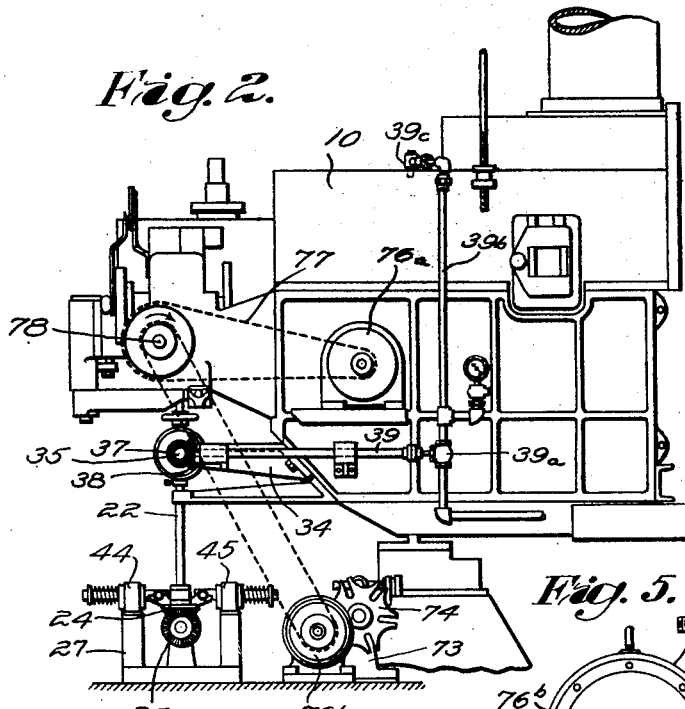
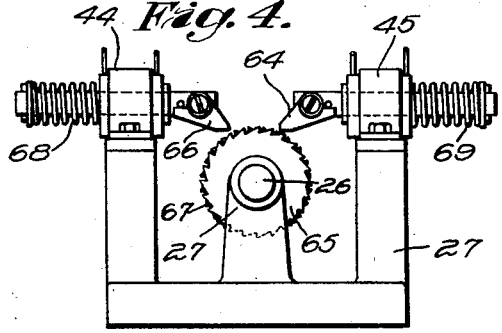
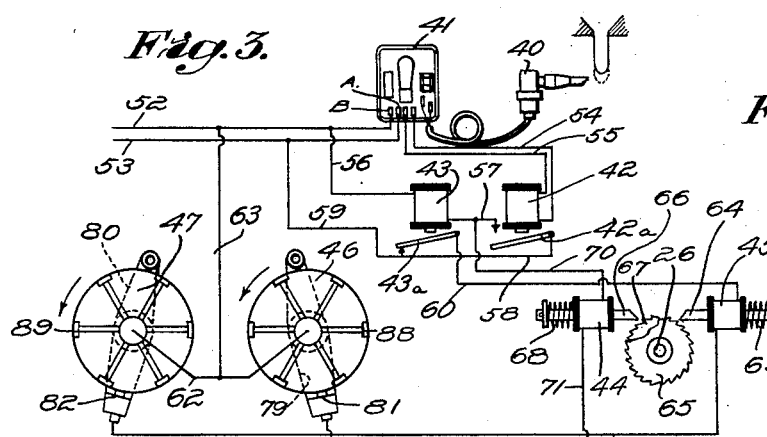
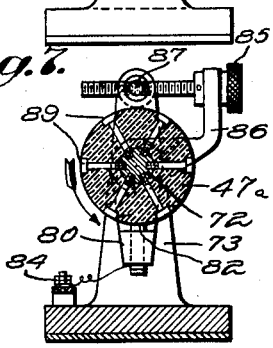
Inventor:
Everett O. Hiller
by Brown & Parham
Attorneys
Witness
W. B. Thayer.

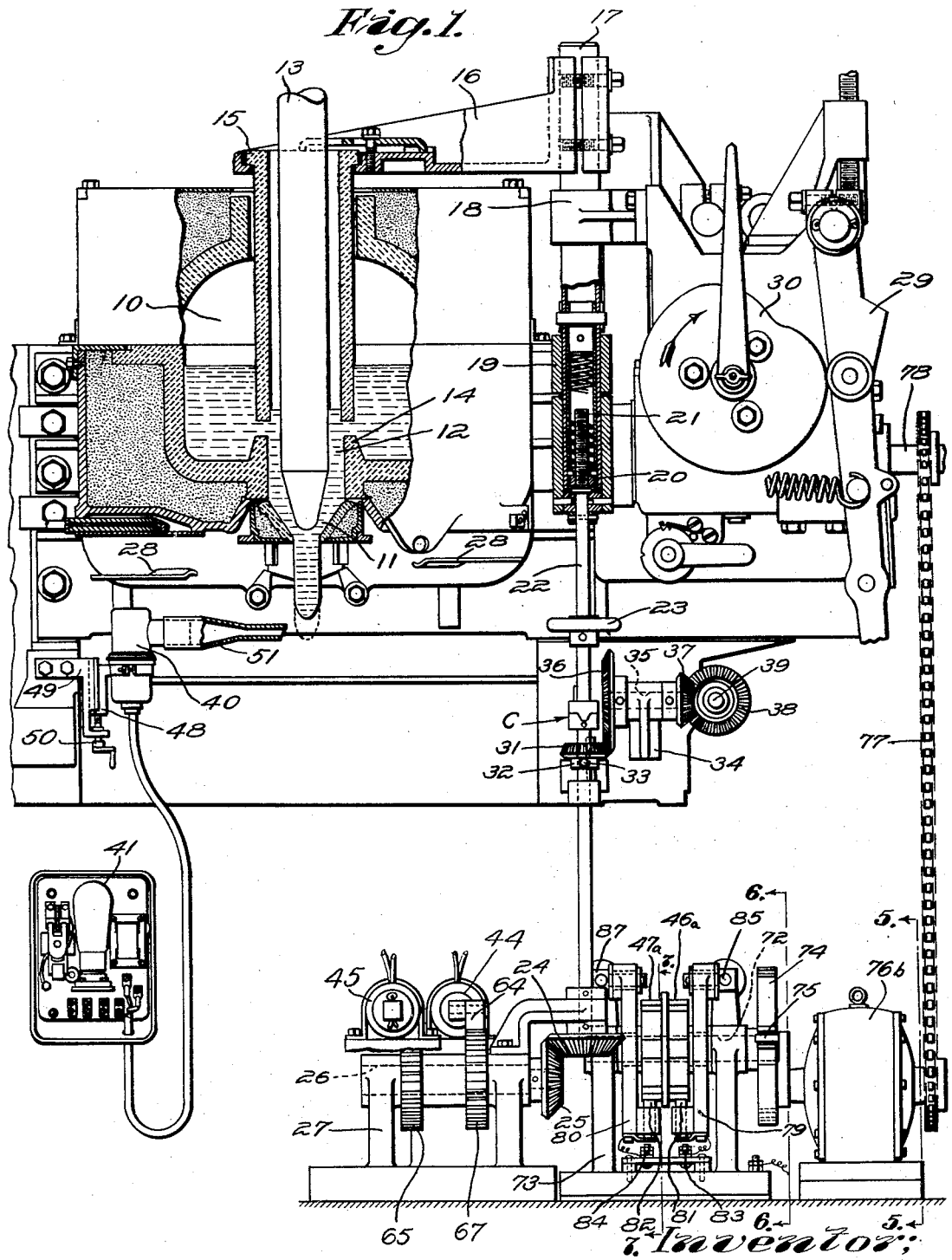

Patented Jan. 2, 1934

1,941,896

UNITED STATES PATENT OFFICE 1,941,896

PHOTO-ELECTRIC CONTROL OF GLASS FEEDERS

Everett O. Hiller, West Hartford, Conn., assignor to Hartford-Empire Company, Hartford, Conn., a corporation of Delaware Application June 10, 1931. Serial No. 543,255

8 Claims. (Cl. 49—55)

The present invention relates to the automatic feeding of molten glass in uniform and controllable charges by the suspended charge method, and particularly relates to the automatic control of the weight and/or shape of the charges in response to the variations from the normal in the character of preceding charges.

As particularly shown herein, the invention constitutes an improvement in automatic control of a feeder of the type well known in the art, as the Hartford-Empire single feeder, illustrated and described in the United States patent to Karl E. Peiler, 1,760,254, it being primarily an application of novel control means for regulating the glass flow regulating means of that or similar feeders, which acts automatically and in response to the variations from normal of a given charge or suspended charge mass to the end that succeeding charges may be of corrected or normal characteristics.

The invention makes use of the well known photo-electric cell and of novel mechanism operated thereby, acting in response to light emanating from suspended charge masses of molten glass issuing from a feeder to automatically maintain or adjust the flame or heat applied to the glass in the feeder forehearth, and/or to adjust the position of a weight controlling tube or gate to the end that succeeding suspended masses may be maintained at the proper length and shall contain the proper amount of glass at the time portions of these masses are severed to form mold charges.

Obviously, the invention in its broader aspects may be applied to any of the numerous controls of the aforesaid Hartford-Empire single feeder, and may be readily adapted to act upon the controls of feeders of other makes or types, and it is understood that the invention is not to be limited to the particular mechanism or to its application to the particular controls of the particular feeder described in the following specification and shown in the accompanying drawings, in which:

Figure 1 is an end elevation showing of a feeder of the type of the Hartford-Empire single feeder above referred to, certain parts being shown in section;

Fig. 2 is a side elevation of the mechanism of Fig. 1;

Fig. 3 is a diagram showing the arrangements and electrical connections by which the light variations on the photo-electric cell are made effective to regulate the length and weight of the suspended charges;

Fig. 4 is an enlarged showing of the details of the solenoids and their pawls coacting with suitable ratchets to effect the adjustments referred to;

Figs. 5, 6, and 7 are views taken respectively on the lines 5, 6 and 7 of Fig. 1, showing details of the commutator mechanism and drive therefor.

In the drawings, 10 represents the forehearth of a Hartford-Empire single feeder having a submerged outlet 11, above which is a well 12 in which a discharge controlling plunger 13 is mounted for reciprocation toward and from the outlet by means not shown, but which may be as shown in the aforesaid patent to Peiler. The manner in which the plunger controls the shaping of the charges is well known.

A curb 14, surrounding the well and extending upwardly from the bottom of the interior of the forehearth, is in alignment with a vertically adjustable flow controlling tube 15. As shown in Fig. 1, this tube is carried by an overhanging arm 16 carried by a shaft 17 mounted for vertical movement in a suitable bracket 18. A fixed housing 19 receives the lower end of the shaft.

The lower end of shaft 17 is internally threaded as at 20, to receive threads 21 of a rod 22 journaled in the lower end of the housing 19. The rod 22 may be provided with a hand wheel 23 for manual variation of the vertical position of the tube 15.

The rod 22 is arranged to be automatically turned to raise and lower the tube 15, as desired, and to this end, carries a bevel gear 24 at its lower end which engages bevel gear 25 on a countershaft 26 carried in bearings in a bracket 27. The shaft 26 may be automatically turned in either direction by means hereinafter described, and this movement imparts rotary movement in one direction or the other to the shaft 22 to raise and lower the tube 15 to increase and decrease the size of the passageway for the glass between the curb 14 and the lower end of the tube 15. The size of the passageway largely determines the weight of the glass flowing into the well and through the orifice 11 in a given period of time.

The shaft 22 may also carry a bevel gear 31 having a hub 32 splined to the shaft and held in vertical position thereon by a set screw 33. By loosening the screw 33, the gear 31 may be given longitudinal movement on the shaft to throw it in and out of meshing relation with the mechanism hereinafter described, which controls the fuel supply to the burners in the forehearth 10.

Thus, as desired, the tube 15 may be adjusted either manually or automatically with or without a corresponding adjustment of the burner. The portion of the shaft 22 above the gear 31 may comprise aligned separate sections connected detachably as by a conventional clutch, such as shown more or less diagrammatically in Fig. 1 and designated C, whereby the portion of the shaft for adjusting the tube 15 may be uncoupled from the lower portion of such shaft to permit automatic adjustment of the burner independently of adjustment of the tube 15.

Mounted in bearings on the fixed bracket 34 is a countershaft 35 carrying bevel gears 36 and 37 at either end thereof, gear 36 meshing with the gear 31 and the gear 37 with a bevel gear 38 on a shaft 39, which is mounted in suitable bearing brackets.

The end of the shaft 39, opposite that carrying gear 38, may be suitably connected to a valve 39a in the fuel line 39b going to a burner or burners 39c, which supply heat to the surface of the glass within the forehearth 10. The connection to the valve 39a is such that rotary movement imparted to the shaft 39 will increase or decrease the opening of the valve and hence the supply of fuel to the burner.

A pair of reciprocating shear blades 28 are mounted to move periodically to closed position below and in a plane spaced from the outlet 11 to periodically sever mold charges from the glass which issues from the orifice, and which hangs suspended therefrom, as illustrated in Fig. 1. The means for operating the shears are not fully shown, but are well known in the art and may be such as are shown and described in the aforesaid patent to Peiler, and include the operating arm 29 and the cam 30.

The control mechanism, which effects movement of the shaft 26 and hence of the tube 15 and/or the valve 39a, comprises a photo-electric cell 40, an amplifier and relay mechanism 41, a pair of control relays 42 and 43, a pair of pawl carrying solenoids 44 and 45 and a pair of commutators or circuit making and breaking devices 46 and 47 (see Figs. 1 and 3).

The positioning and arrangement of the control mechanism and parts is such that the response of the photo-electric cell to the light of the lower end of a suspended charge mass, or the absence of such light, will be such as to operate the mechanisms referred to, to make an automatic correction whenever a suspended mass, at or about the time of severance of a mold charge therefrom, extends either too far below the shearing plane or does not extend far enough therebelow. Thus, the length of the charges at the time of severance may be automatically maintained uniform and the charges therefore of the same weight and shape.

The photo-electric cell or tube may be mounted on a slide 48 carried by a suitable slideway in a bracket 49, and the level of the cell may be adjusted vertically by means of adjusting screw 50, in order that the hooded sight 51 may be presented at the desired level for charges of different length. When a mass of glass suspended from the outlet extends downwardly past the line of sight defined by the hood 51, the intensity of the light upon the cell 40 is increased, and the resistance to the current passing through the cell is accordingly varied.

As this variation effects but a slight change in the current in the cell (a few micro-amperes), it is necessary to provide a suitable amplifying and relaying system to make this change effective, and this amplification may be obtained in well known ways as, for example, by the use of a standard photo-electric relay unit such as illustrated in Figs. 1 and 3 at 41. This unit may comprise a pliotron amplifying tube, a sensitive relay connected to the plate circuit of the pliotron and energized or deenergized in accordance with the amounts of light in the photo-electric tube 40. The photo-electric tube and the relay unit, as a whole, are well known, and may, for example, be such as provided by the General Electric Company of Schenectady, New York, and described in its bulletin GEA-1266A as its CR7505A2 photo-electric relay.

Referring now particularly to Fig. 3, the relay unit 41 is shown as provided with contacts A and B connected with alternating current supply lines 52 and 53 from which current is supplied to the relay unit and the photo-electric cell, and from which upon the operation of the amplifier and relay of the unit 41 may supply current through lines 54 and 55 to the normally deenergized control relay 42. The armature 42a of this relay is normally open to open a circuit from the supply lines through wires 56, 57 and 58 through the control relay 43. The armature 43a of the relay 43 normally closes a circuit from the supply line 53 through lines 59, 60 and 61, commutator 47, lines 62 and 63, through the coil of solenoid 45. This solenoid carries a pawl 64 adapted to cooperate with a ratchet wheel 65 mounted on shaft 26.

The opposing solenoid 44 carries a similar pawl 66 which coacts with a ratchet wheel 67 also upon the shaft 26. Through this mechanism, the shaft 26 may be turned in either of opposite directions in accordance with the energization or deenergization of the solenoids 44 and 45. The cores of the solenoids 44 and 45 extend rearwardly beyond their coils, and are held in their outer or inoperative position by compression springs 68 and 69 when the solenoids are deenergized.

The circuit of the solenoid 44 may be traced from the supply line 53, wire 59, line 58, armature 42a of relay 42 when closed, line 57, line 70, solenoid 44, line 71, commutator 46, line 63, to the supply line 52.

The commutators 46 and 47 comprise wheels 46a and 47a carried by a shaft 72 mounted in suitable bearings in a bracket 73. This shaft also carries the wheel 74 of a Geneva drive adapted to be driven by a crank pin 75 mounted on a shaft 76 driven through a speed reducer 76b in synchronism with the moving parts of the feeder, particularly the shear operating mechanism which, as shown in Fig. 2, is driven from the motor 76a through chain 77 and shaft 78.

The commutators 46 and 47 are provided with stationary but adjustable contact carriers 79, 80, respectively, each of which is pivotally mounted near its center about the shaft 72. These members carry contacts 81, 82, respectively, connected by flexible wires to contact posts 83 and 84, respectively. Each contact carrier may be adjusted angularly about the axis of the shaft 72 by an adjusting screw 85 which is journaled in an extension 86 of the bracket 73, and is screw threaded into a swivel block 87 carried by the upper end of the contact members 79, 80.

The commutator wheels 46a, 47a carry spiders of electrical conductive material terminating in contacts 88, 89 adapted, at suitable times, to contact with the contacts 81 and 82, respectively. As indicated in Fig. 3, these spiders are electrically connected with the main supply line 52 at their centers by line 63, and each provide contacts corresponding in number and position to the number of steps in each complete revolution of the Geneva drive 74.

The commutators are so adjusted and set that the contacts 88 of the wheel 46a contact with the contacts 81 slightly ahead of the instant at which the shears 28 complete their severing operation, while the contacts 89 of the wheel 47 preferably contact with their contact 82 at the instant of completion of the severing stroke of the shears.

From the foregoing, it is seen that the photo-electric cell and its associate control mechanism effects the control of the temperature or weight, or both, of the charges through what may be termed two effective "looks" along the path of sight for each charge, and acts upon the mechanism in response to the light condition existing at the instants of those "looks", the timing of the "looks" being controlled by the setting of the commutators and their contacts 81 and 82. The operation may be understood from the following three cases or examples.

(1) When a contact 88 on the wheel 46a makes the connection through its contact 81 to the solenoid 44, that solenoid will act or not in accordance with the energization or deenergization of the control relay 42. This relay will be energized if, at the moment in question, the lower end of the hot glass has descended into the line of sight of the hood 51. This occurs when the glass, by reason of a too great lifting of the tube 15, the presence of too much heat, and hence too low viscosity, or for other reasons, has prematurely descended into the line of sight of the electric cell. The view that is thus obtained of the lower end of the glass and the changed light condition in the cell caused thereby, causes the photo-electric relay 41 to energize the relay 42 which lifts its armature. This completes the circuit from the supply line 53, line 59, line 58, line 57, line 70, through solenoid 44, line 71, contact 81, contact 88, line 62, line 63, to the supply line 52. The solenoid 44 responds to correct the trouble by moving its pawl forwardly to turn the shaft 26 in a clockwise direction to lower the tube 15 and/or to restrict the valve 39, and thus reduce the fire. As the commutator wheels 46a move further, as indicated by the arrows in Fig. 3, this circuit is broken at the contact 81, and the armature of the relay 42 drops, and the pawl is retracted by spring 68. Shortly thereafter, and at a selected time, preferably the instant the shears first contact with the glass, the commutator 47 makes contacts 89—82. At this moment, the electric cell still "sees" glass and the contacts of the armature 42 are again made. This does not affect the solenoid 44, as its contact is broken at 81. The circuit to the control relay 43 is made. The making of this circuit breaks the circuit otherwise made from supply line 53, line 59, armature 43a, line 60, solenoid 45, line 61, contacts 82, 89, and line 62 to main line 52. There is, therefore, no actuation of the solenoid 45 and there should be none.

(2) In a second case in which, by reason of a too great lowering of tube 15, the presence of too little heat and hence too high viscosity, the glass does not extend far enough below the severing plane, the first "look" of the electric cell does not "see" glass along the line of sight, so that when contact 81, 88 is made, nothing happens, as the relays 42 and 43 are not energized. When the second "look" is taken and contacts 82, 89 are made by commutator 47, again no glass is in the line of sight, the relay 42 is not energized, nor is the relay 43, hence the circuit to the solenoid 45 is made and the solenoid moves its ratchet wheel 80 and the shaft 26 in the opposite or counterclockwise direction to lift the tube 15 and/or to turn up the fuel valve to correct the condition assumed.

(3) Finally, when the rate of flow and stretch of the glass is proper, the first "look" of the electric cell fails to "see" glass, and the relay 42 is not energized. Hence, the solenoid 44 is inactive and nothing happens. At the time of the second "look", when the contacts of the commutator 47 are made, the end of the glass has just reached the line of sight of the electric cell and the relays 42 and 43 are energized. The energization of the relay 43 breaks the circuit otherwise made to the solenoid 45; this solenoid remains inactive and nothing happens, and this is as it should be.

Obviously, corrections applied by way of turning up the burner or raising and lowering the control tube or gate may be applied to variations of the position, length of stroke or other adjustments of the plunger, and may be applied in feeders of the pneumatic type by suitable control of pressure or other valves, or may be applied by regulation of draft rather than fuel supply. In the case of electrically heated forehearths, the control may be applied to a regulation of the current supply in a manner analogous to that heretofore described. The steps of correction may be made in such increments as may be desired, and may be applied to as many or as few of the instrumentalities as is desired.

It is also obvious that the photo-electric cell may be differently applied and the system of control varied as, for example, two cells and separate systems may be used to accomplish what is here accomplished by the successive "looks" of a single cell, or the same cell may be automatically and mechanically moved to different levels or angles of sight to effect a similar control in response to two impulses.

It is of the essence of the present invention that there is provided for a feeder of the suspended charge type a fully automatic control acting to correct inaccuracies in the characteristics of the charges, effective without physical contact with the charges, and in direct response to the variations to be corrected. I prefer to apply the mechanism and principle of this invention as here described, to act in response to variations in the length of the suspended mass. It may obviously be applied to other characteristics of the charge as, for example, the cross section thereof at a selected point or points while it is hanging freely from the outlet.

No claim is made herein to the broad invention of employing a photo-electric cell, arranged to receive light from a "suspended" mold charge at a level spaced a predetermined distance below the discharge outlet and controlling automatic mechanism for adjusting any suitable mechanism for regulably controlling discharge from the outlet so as to obviate in a succeeding charge variations from the normal in the preceding charge, and including adjustment of the speed of the feeder as a whole. Nor is any claim herein directed to the photo-electric control means for adjusting the speed of the feeder and of an associate glassware fabricating machine, as such broad and specific subject matters are the invention of Kenneth M. Henry and Burton A. Noble, as disclosed and claimed in their application, Serial No. 547,802, filed June 30, 1931, owned by the owner of the present application.

Having fully described the invention, I claim:

1. In mechanism for automatically feeding molten glass in suspended mold charges, a container for the glass having an orifice in the bottom thereof, means for regulating the discharge of the glass through and into suspension from the orifice including heating means within the container, and means out of contact with the glass but directly responsive to variations in the characteristics of the suspended masses for automatically regulating the heating means to correct said variations.

2. In mechanism for automatically feeding molten glass in suspended mold charges, a container for the glass having an orifice in the bottom thereof, a member submerged in the glass in the container for regulating the rate at which glass is supplied to said orifice and at which it flows through and into suspension in a series of mold charge masses below the orifice, periodically acting severing means for severing a mold charge from each suspended mass, a photo-electric cell, a hood therefor adapted to establish a line of sight at a selected position below the orifice through which the ends of the suspended masses may pass, means for supplying electric current to the cell, means for amplifying variations in said current within the photo-electric cell created by variations of light upon said cell, means responsive to variations of current in said cell thus amplified for selectively raising and lowering the submerged member, said last-named means including control relays and commutator mechanism adapted to make effective the amplified variations at two separated instants during the suspension of each mold charge mass whereby to cause automatic raising or lowering of the submerged member in response to the condition of a suspended mass at two separated instants during its suspension.

3. In mechanism for automatically feeding molten glass in suspended mold charges, a container for the glass having an orifice in the bottom thereof through which glass is discharged and from which it is suspended in a series of suspended masses, periodically acting severing means for severing a mold charge from each mass, means for heating the glass in the container to regulate its temperature and viscosity, a photo-electric cell positioned below the orifice, a hood therefor adapted to establish a line of sight at a selected position below the orifice through which the ends of the suspended masses may pass, means for supplying electric current to the cell, means for amplifying variations in said current within the photo-electric cell created by variations of light upon said cell, means responsive to variations of current in said cell thus amplified for selectively regulating the supply of fuel to the heating means, said last-named means including control relays and commutator mechanism adapted to make effective the amplified variations at two separated instants during the suspension of each suspended mold charge mass whereby to cause automatic regulation of the fuel to the heating means in response to the condition of the suspended mass at two separated instants during its suspension.

4. An automatic glass feeder of the suspended mold charge type, a container for the glass having a submerged outlet through which the glass may flow and below which it may accumulate in suspension, means for severing mold charges from each mass while so suspended below the outlet, a flow regulating member immersed in the glass, a vertically adjustable support for said member, means for automatically adjusting the vertical position of said member including a shaft, a pair of oppositely disposed ratchet wheels thereon, a pair of oppositely disposed pawls cooperating respectively with said ratchet wheels, a solenoid biased in the inoperative direction associated with each pawl, and means for selectively energizing the solenoids in response to variations from the normal in the length of the suspended masses, said selective energizing means including a photo-electric cell, control relay and commutator mechanism adapted to determine spaced instants at which variations in the light upon the photo-electric cell caused by the position of the lower ends of the suspended masses may be made effective through said relay to selectively operate the solenoids.

5. In an automatic glass feeder of the suspended mold charge type, comprising a container for the glass having a submerged outlet through which the glass may flow and below which it may accumulate in suspension, means for severing mold charges from each mass while so suspended below the outlet, and heating means located within the container for regulating the temperature and viscosity of the glass, a valve controlling the fuel to said heating means, means for automatically opening and closing the valve including a shaft, a pair of oppositely disposed ratchet wheels thereon, a pair of oppositely disposed pawls cooperating respectively with said ratchet wheels, a solenoid biased in the inoperative direction associated with each pawl, and means for selectively energizing the solenoids in response to variations in the length of the suspended masses at the instant of severance of a mold charge therefrom, said selective energizing means including a photo-electric cell, a control relay and commutator mechanism adapted to determine spaced instants at which variations in the light upon the photo-electric cell caused by the position of the lower end of a suspended mass may be made effective through said relay to selectively operate the solenoids.

6. The combination with mechanism for feeding molten glass in suspended charges, including a container for the glass having a submerged discharge outlet, means for regulating the discharge of glass through and into suspension from the outlet, said regulating means including heating means within the container, of a photo-electric cell arranged to receive light from the suspended masses at a level spaced a predetermined distance below the outlet, and means controlled by said photo-electric cell in response to variations in the characteristics of the suspended masses for automatically regulating the heating means to correct in a succeeding charge a variation from the normal in a preceding charge.

7. The combination with mechanism for feeding molten glass in suspended charges, said mechanism including a plurality of relatively adjustable parts for controlling the feeding of glass from a discharge outlet into suspension from the outlet, and means out of contact with the glass but directly responsive to variations in the characteristics of each suspended mass for adjusting one of said relatively adjustable parts of the feeder with respect to other parts thereof to correct in succeeding suspended charge masses variations from the normal in preceding suspended masses.

8. In mechanism for feeding molten glass in suspended mold charges, a container for the glass having a submerged discharge outlet, a vertically adjustable implement for regulating flow of glass from the container to said outlet, means for heating the glass within the container to aid in regulating discharge of glass to the outlet, and automatic control means out of contact with the glass and responsive to variations in the characteristics of each suspended mass for varying both said flow regulating implement and said heating means to correct in succeeding suspended mold charge masses variations from the normal in preceding mold charge masses.

EVERETT O. HILLER.